United States Patent Office 2,849,765
Patented Sept. 2, 1958

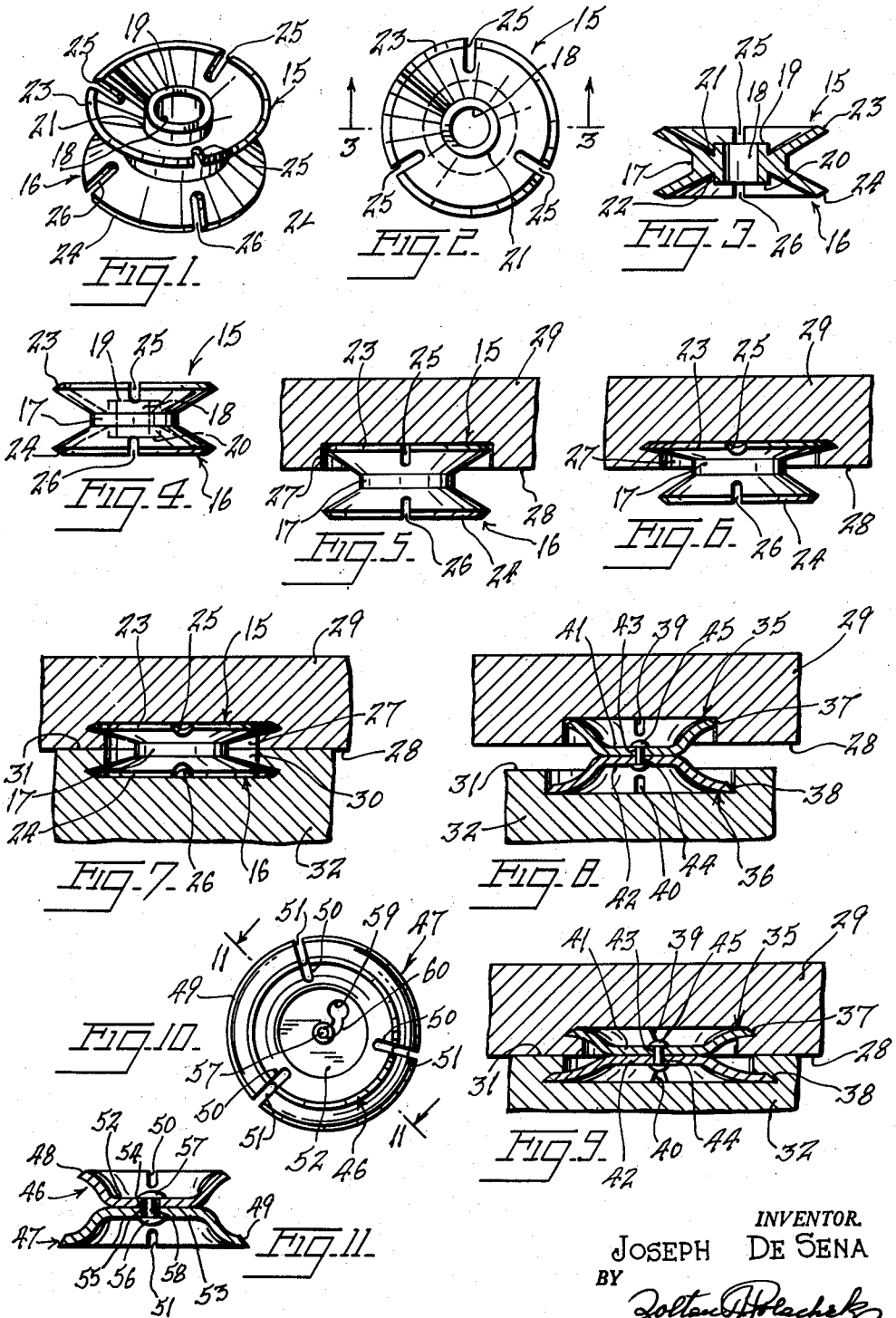

2,849,765
DEFORMABLE AND DETACHABLE FASTENER UNIT

Joseph De Sena, Long Island City, N. Y.

Application April 18, 1955, Serial No. 502,057

1 Claim. (Cl. 20—92)

This invention relates to new and useful improvements in fastening devices for joining two articles or pieces together.

More particularly, the present invention proposes the construction of an improved fastener unit which can be used easily and conveniently to secure any two articles together as well as to secure ornaments to any desired surface.

As a further object, the present invention proposes forming the fastener unit with two shallow cup-shaped deformable discs having peripheral cutting edges with spaced radial slots so that when seated in opposed cavities in two surfaces the discs can be deformed and will hold the articles containing such surfaces together merely by applying pressure to squeeze the two surfaces together.

Still further, the present invention proposes constructing the discs so they may be separated at will and can be rejoined together after they have been attached to the surfaces of articles or pieces removably to join such articles or pieces together.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a fastener unit constructed and arranged in accordance with the present invention.

Fig. 2 is a top plan view of the structure shown in Fig. 1.

Fig. 3 is a sectional view taken on line 3—3 of Fig. 2.

Fig. 4 is a side view of the structure shown in Figs. 1, 2 and 3.

Fig. 5 is a view similar to Fig. 4 but showing the fastener unit in a cavity in the surface of an article or piece shown in section.

Fig. 6 is a view similar to Fig. 5 but showing the fastener unit secured to the article or piece.

Fig. 7 is a view similar to Fig. 6 but showing the fastener unit securing two articles or pieces together.

Fig. 8 is a view generally similar to Fig. 5 but illustrating a modification of the present invention.

Fig. 9 is a view of the structure shown in Fig. 8 but showing the fastener unit securing the two articles or pieces together.

Fig. 10 is a view similar to Fig. 2 but illustrating another modification of the present invention.

Fig. 11 is a sectional view taken on line 11—11 of Fig. 10.

The fastener unit, in accordance with the first form of the invention illustrated in Figs. 1 to 7, inclusive, has a pair of shallow cup-shaped deformable discs 15 and 16 which are centrally connected by a spacing shank 17.

Discs 15 and 16 preferably are made of a deformable metal which is generally rigid but which can be deformed by force, such as iron, steel, bronze and the like.

Spacing shank 17 is an annular or cylindrical sleeve with a central bore 18 and having end portions 19 and 20 which extend above the center portions 21 and 22 respectively of the discs 15 and 16.

The discs 15 and 16 have peripheral cutting edges 23 and 24 respectively. Cutting edge 23 of discs 15 contains a plurality of spaced radial slots 25 extending inwardly toward the center portion 21 of the disc.

Similarly, cutting edge 24 of disc 16 contains a plurality of spaced radial slots 26 extending inwardly toward the center portion 22 of this disc 16.

Preferably the sleeve spacing shank 17 and the two discs 15 and 16 are made integral being molded or otherwise formed in one piece.

To use the fastener unit, one of the discs, for example disc 15, is placed in a circular cavity 27 in the surface 28 of an article or piece 29. The cavity 27 is of the same or substantially the same diameter as the disc. The other disc 16 is placed in a like cavity 30 in the surface 31 of another article or piece 32 and the two articles or pieces 29 and 32 are forced together until the surfaces 28 and 31 meet. This pressure forces the discs to deform and spread so that the cutting edges 23 and 24 bury themselves in the articles or pieces 29 and 32 respectively to lock and secure the articles or pieces together. The article or piece 32 may be an ornament which it is desired to be anchored to the surface 28 of article 29. With this fastener unit any two articles may be joined together.

The modification of the invention illustrated in Figs. 8 and 9 is characterized by the provision of a pair of shallow cup-shaped deformable discs 35 and 36 having peripheral cutting edges 37 and 38 respectively with radial spaced slots 39 and 40. In addition, the discs 35 and 36 have central portions 41 and 42 with central openings 43 and 44. A rivet 45 extends through the central openings 43 and 44 to secure the discs 35 and 36 together.

The modification of the invention illustrated in Figs. 10 and 11 is characterized by the provision of a pair of shallow cup-shaped deformable discs 46 and 47 having peripheral cutting edges 48 and 49 with spaced radial slots 50 and 51 extending inwardly toward central portions 52 and 53.

Discs 46 and 47 also have central openings 54 and 55. A rivet or pin 56 is fixed at one end to disc 47 and extends through the central opening 55 of disc 47. Rivet or pin 56 has a free head 57 and a shank 58. Disc 46 in addition to its central opening 54 contains a larger opening 59 adjacent the central opening 54 and a curved slotted opening 60 is disposed between and connects the larger opening 59 with the central opening 54. The free head 57 freely passes through the larger opening 59 and the shank 58 of rivet 56 traverses the curved slotted opening 60 and fits in the central opening 54. By this arrangement the two discs 46 and 47 may be removably connected together at will either before or after they have been secured to articles or pieces in the manner described above.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A fastener unit for removably securing two flat rigid articles together, said articles having axially aligned facing cylindrical cavities, comprising a pair of cup-shaped deformable discs, each of said discs having a peripheral cutting edge with a plurality of spaced radial slots intersecting the peripheral edge and extending inwardly to define a plurality of leaves, said leaves being adapted to secure the discs in the respective cavities with edges of said leaves forced into the walls of said cavities and with convex central portions of the discs facing outwardly from the cavities, said discs each having a central opening, one of said discs having a larger opening disposed adjacent the central opening thereof and an elongated curved slotted opening between and connecting said larger opening and said central opening, and a rivet fixed at one end in the central opening of the other disc, said rivet having a headed free end standing off on a shank from the convex surface of said other disc, said headed free end having a diameter smaller than said larger opening and larger than the central opening in said one disc so that said headed free end fits through said larger opening and said shank traverses the slotted opening to lock the two discs together in a quick detachable connection.

References Cited in the file of this patent

UNITED STATES PATENTS

| | | |
|---|---|---|
| 456,391 | Andrus | July 21, 1891 |
| 803,309 | Schaeffer | Oct. 31, 1905 |
| 1,511,273 | Draper | Oct. 14, 1924 |
| 1,776,500 | Gilpin | Sept. 23, 1930 |
| 2,236,926 | Surface | Apr. 1, 1941 |
| 2,238,488 | Foskett | Apr. 15, 1941 |